United States Patent
Kanj et al.

(10) Patent No.: US 9,184,493 B2
(45) Date of Patent: Nov. 10, 2015

(54) TRANSMISSION LINE FOR MOBILE ELECTRONIC DEVICE

(75) Inventors: Houssam Kanj, Waterloo (CA); Huanhuan Gu, Kitchener (CA); James Paul Warden, Fort Worth, TX (US)

(73) Assignee: BlackBerry Limited, Waterloo, Ontario (CA)

(*) Notice: Subject to any disclaimer, the term of this patent is extended or adjusted under 35 U.S.C. 154(b) by 217 days.

(21) Appl. No.: 13/556,945

(22) Filed: Jul. 24, 2012

(65) Prior Publication Data
US 2014/0029213 A1    Jan. 30, 2014

(51) Int. Cl.
*H05K 7/02*  (2006.01)
*H01Q 1/24*  (2006.01)
*H04B 1/04*  (2006.01)

(52) U.S. Cl.
CPC ............ *H01Q 1/243* (2013.01); *H04B 1/0458* (2013.01); *Y10T 29/49117* (2015.01)

(58) Field of Classification Search
CPC ........................................................ H05K 7/02
USPC ................... 361/752; 343/702, 749; 455/77
See application file for complete search history.

(56) References Cited

U.S. PATENT DOCUMENTS

| | | | |
|---|---|---|---|
| 4,535,307 A * | 8/1985 | Tsukii | 333/35 |
| 4,546,408 A * | 10/1985 | Rodseth et al. | 361/720 |
| 5,138,519 A * | 8/1992 | Stockman | 361/306.1 |
| 6,266,019 B1 | 7/2001 | Stewart et al. | |
| 2008/0316116 A1 * | 12/2008 | Hobson et al. | 343/702 |
| 2009/0256758 A1 | 10/2009 | Schlub et al. | |
| 2010/0090921 A1 | 4/2010 | Kim et al. | |
| 2012/0019418 A1 | 1/2012 | Wong et al. | |
| 2012/0262343 A1 * | 10/2012 | Radojkovic | 343/702 |

FOREIGN PATENT DOCUMENTS

EP    2424033    2/2012

OTHER PUBLICATIONS

European Patent Office, "Extended European Search Report", issued in connection with European patent application No. 12177616.5, dated Dec. 18, 2012 (8 pages).

* cited by examiner

*Primary Examiner* — Dion R Ferguson
*Assistant Examiner* — Mandeep Buttar
(74) *Attorney, Agent, or Firm* — Fish & Richardson P.C.

(57) ABSTRACT

According to embodiments described in the specification, a method and mobile electronic device are provided for tuning an antenna. The mobile electronic device comprises an electrical ground member supporting at least one antenna; a housing containing the electrical ground member and having a conductive ring defining the perimeter of the housing; and a conductive tuning member disposed between the conductive ring and the electrical ground member, for transforming an impedance between the electrical ground member and the conductive ring; wherein the conductive tuning member is connected to the conductive ring by a first short, and to the electrical ground member by a second short.

18 Claims, 12 Drawing Sheets

TRANSMISSION LINE FOR MOBILE ELECTRONIC DEVICE

FIELD

The specification relates generally to mobile electronic devices, and specifically to a transmission line for a mobile electronic device.

BACKGROUND

Mobile electronic devices, such as smartphones, are generally becoming more compact. In addition, there is an increased demand from consumers for smartphones and other devices without external antennas. Providing internal antennas, or at least antennas that do not extend from the main body of the devices, is challenging as the antennas tend to be located closely to other components that may interfere with antenna performance.

In addition, the housings of smartphones can include metal components which also interfere with antenna performance. Further, the introduction of network technologies such as LTE, which employ lower frequencies, can heighten the difficulties in obtaining acceptable performance from smaller antennas.

BRIEF DESCRIPTIONS OF THE DRAWINGS

Embodiments are described with reference to the following figures, in which.

DETAILED DESCRIPTION OF THE EMBODIMENTS

According to an aspect of the specification, a mobile electronic device is provided, comprising: an electrical ground member supporting at least one antenna; a housing containing the electrical ground member and having a conductive ring defining the perimeter of the housing; and a conductive tuning member disposed between the conductive ring and the electrical ground member, for transforming an impedance between the electrical ground member and the conductive ring; wherein the conductive tuning member is connected to the conductive ring by a first short, and to the electrical ground member by a second short.

According to another aspect of the specification, a method is provided, comprising: fastening a conductive tuning member between a conductive ring defining a perimeter of a housing of a mobile electronic device, and an electrical ground member contained within the housing; selecting a first short location for connecting the conductive tuning member to the conductive ring; and selecting a second short location for connecting the conductive tuning member to the electrical ground member.

Figure 1:
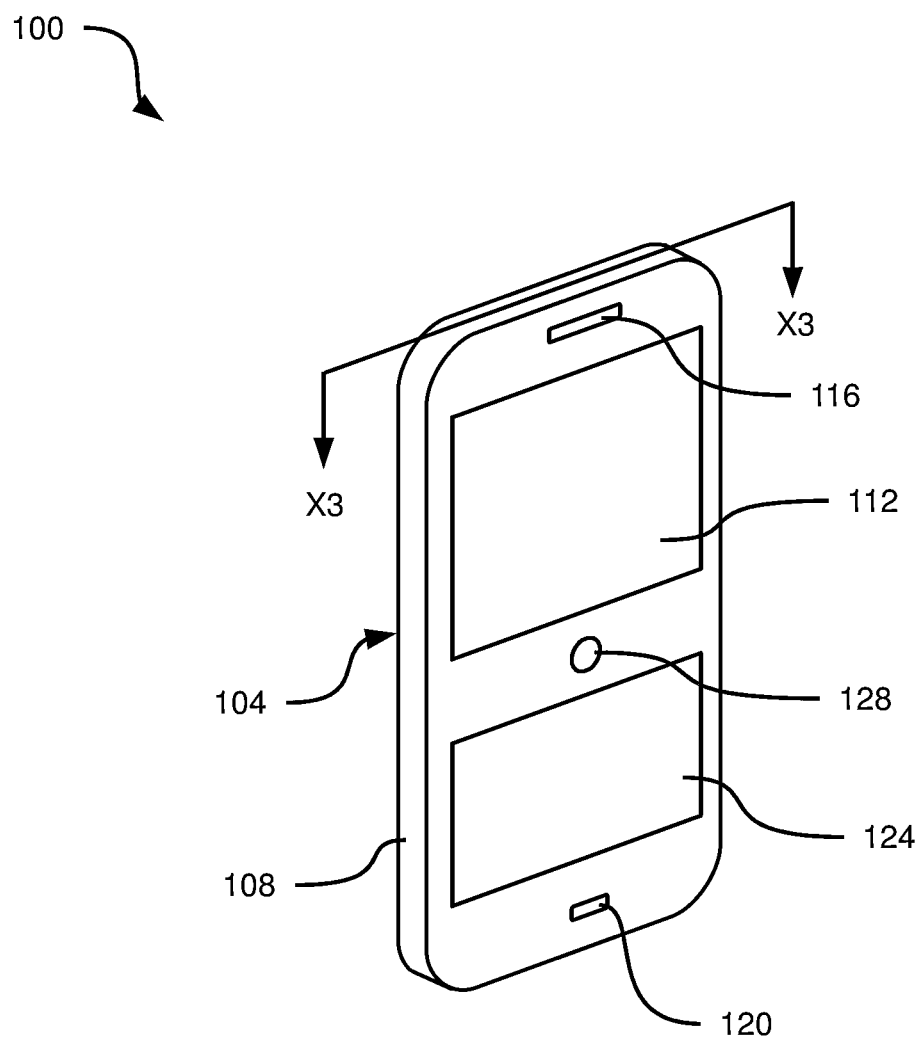
FIG. 1 depicts a mobile electronic device, according to a non-limiting embodiment.

FIG. 1 depicts a mobile electronic device 100, which in the present embodiment is based on the computing environment and functionality of a hand-held wireless communication device. It will be understood, however, that mobile electronic device 100 is not limited to a hand-held wireless communication device. Other mobile electronic devices are also contemplated, such as cellular phones, smart phones, Personal Digital Assistants ("PDAs"), media or MP3 players, tablet computers, laptop computers, and the like.

Mobile electronic device 100 includes a housing 104 which supports the various other components of mobile electronic device 100. Housing 104 includes a conductive (that is, electrically conductive) ring 108 (also referred to herein simply as "ring 108") defining the perimeter of housing 104. In the embodiment shown in FIG. 1, ring 108 extends continuously around the perimeter of housing 104. Ring 108 can be constructed of any electrically conductive material, including any one or combination of aluminum and other metals. The remaining portion of housing 104 can be constructed of any suitable material, or combination of materials, including without limitation plastics (e.g. Polycarbonate/Acrylonitrile Butadiene Styrene ("PC/ABS")) and metals (e.g. aluminum or other metals).

Mobile electronic device 100 also includes one or more output devices, including without limitation a display 112 and a speaker 116. Other output devices are also contemplated but not shown, such as a Light Emitting Diode (LED) indicator, a vibrating motor, and the like.

Mobile electronic device 100 additionally includes one or more input devices, including without limitation a microphone 120, a keypad 124. Keypad 124 can be a full QWERTY keyboard or a reduced QWERTY keyboard. Mobile electronic device can also include a pointing device such as a touchpad 128. It is contemplated that other combinations of input and output devices than those shown in FIG. 1 can be provided. For example, touchpad 128 can be replaced with a trackball. As a further example, one or both of keypad 124 and touchpad 128 can be omitted, and a touch screen input device can be integrated with display 112. In still another example, the touch screen input device can be provided in addition to keypad 124 and touchpad 128. In a further example, one or more function keys can be provided in addition to keypad 124. Further combinations and variations will occur to those skilled in the art.

Figure 2:
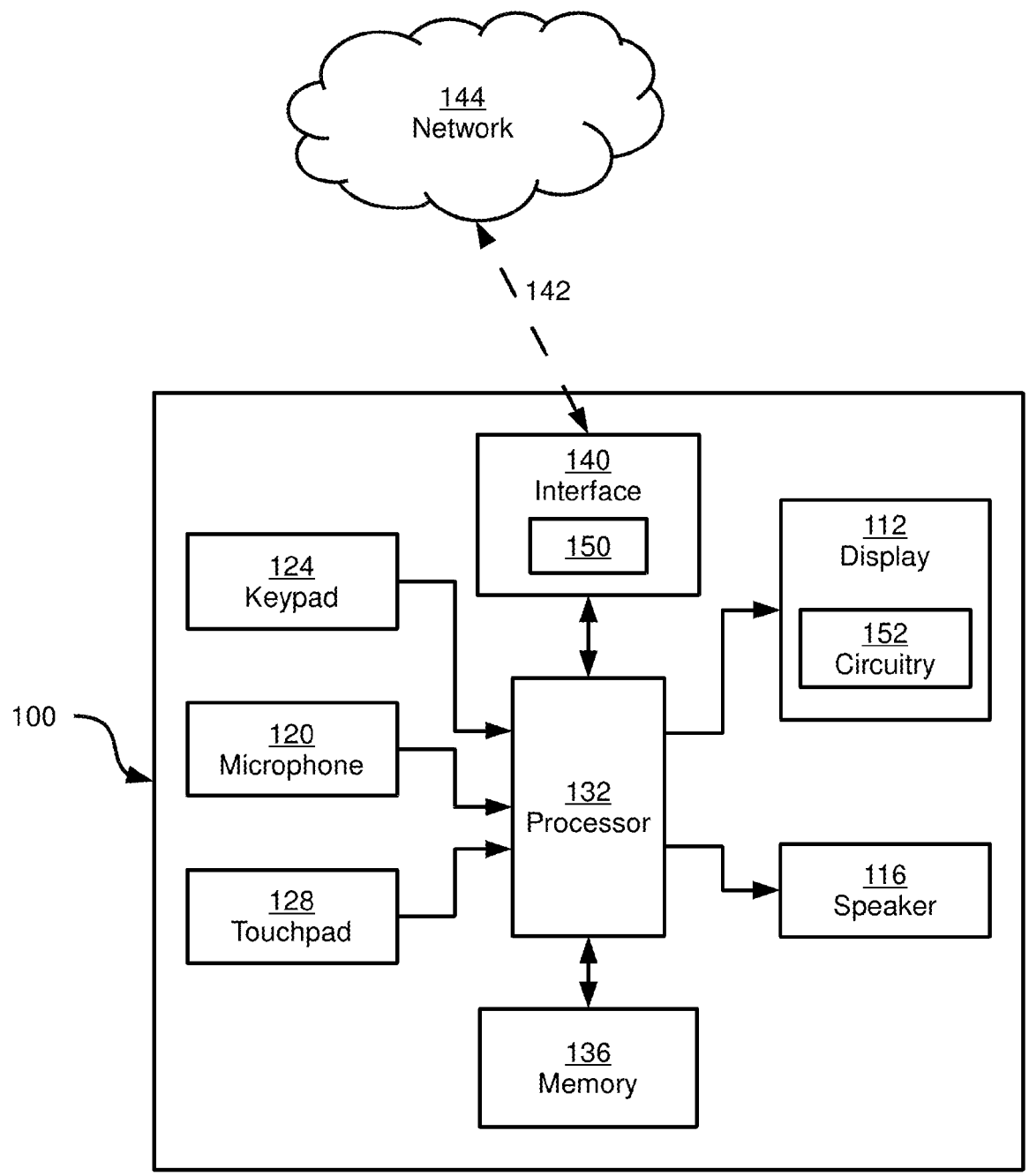
FIG. 2 depicts certain internal components of the mobile electronic device of FIG. 1, according to a non-limiting embodiment.

Referring now to FIG. 2, certain internal components of mobile electronic device 100 are shown. Mobile electronic device 100 includes a processor 132 interconnected with a computer readable storage medium (that is, a non-transitory medium) in the form of a memory 136. Memory 136 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

Mobile electronic device 100 also includes a communications interface 140 interconnected with processor 132. Communications interface 140 allows mobile electronic device 100 to communicate with other computing devices via a link 142 and a network 144. Network 144 can include any suitable combination of wired and/or wireless networks, including but not limited to a Wide Area Network ("WAN") such as the Internet, a Local Area Network ("LAN"), cell phone networks, WiFi networks, WiMax networks and the like. Link 142 can therefore be a wireless link based on Global System for Mobile communications ("GSM"), General Packet Radio Service ("GPRS"), Enhanced Data rates for GSM Evolution ("EDGE"), and the third-generation mobile communication system (3G), Institute of Electrical and Electronic Engineers ("IEEE") 802.11 (WiFi), Long Term Evolution (LTE), or other wireless protocols. In other embodiments, link 142 can be a wired link.

Communications interface 140 is selected for compatibility with link 142 and network 144. Communications interface 140 thus includes one or more transmitter/receiver assemblies, or antennas, and associated circuitry. For example, as shown in FIG. 2, communications interface 140 includes an antenna 150, and can also include processing circuitry for controlling antenna 150. Further discussion of antenna 150 will be provided below.

The above-mentioned input and output devices of mobile electronic device 100 can also be seen in FIG. 2. In particular, microphone 120, keypad 124 and touchpad 128 are shown interconnected with processor 132. The input devices are configured to receive input and provide data representative of such input to processor 132. Thus, keypad 124 can receive input in the form of the depression of one or more keys, and can then provide data representative of such input to processor 132. The data provided to processor 132 can be, for example, an American Standard Code for Information Interchange (ASCII) value for each of the depressed keys. Touch pad 128 can receive input in the form of depression of touch pad 128 or swipe gestures along the surface of touch pad 128, and can then provide data representative of such input to processor 132 in the form of, for example, coordinates representing the location of a virtual cursor.

Display 112 is also shown interconnected with processor 132. Display 112 includes display circuitry 152 controllable by processor 132 for generating interfaces including representations of data and/or applications maintained in memory 136. Display 112 includes a flat panel display comprising any one of, or any suitable combination of, a Liquid Crystal Display (LCD), a plasma display, an Organic Light Emitting Diode (OLED) display, and the like. Circuitry 152 can thus include any suitable combination of display buffers, transistors, LCD cells, plasma cells, phosphors, LEDs and the like. When the input devices of mobile electronic device 100 include a touch screen input device as discussed above, the touch screen can be integrated with display 112.

The various components of mobile electronic device 100 are interconnected, for example via a communication bus. Mobile electronic device 100 can be powered by a battery (not shown), though it will be understood that in some non-limiting embodiments, mobile electronic device 100 can be supplied, in addition to or instead of the battery, with electricity by a wired connection to a wall outlet or other power source.

Figure 3:
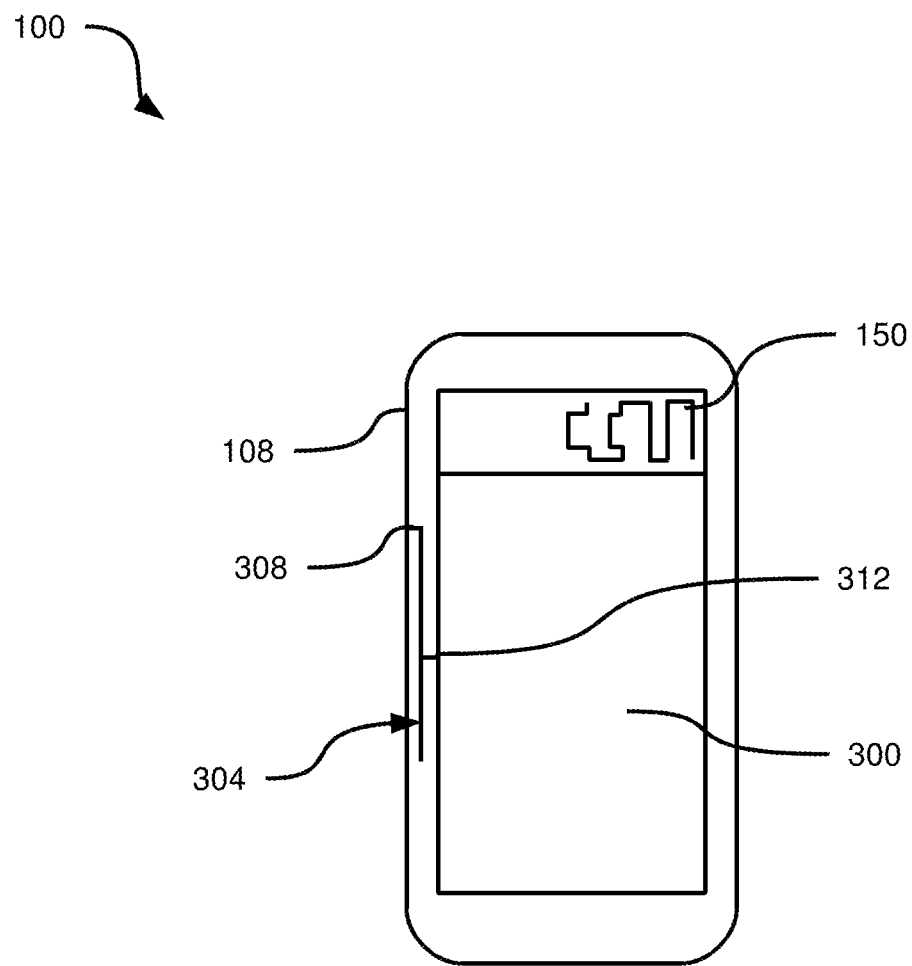
FIG. 3 depicts a cross sectional view of the mobile electronic device of FIG. 1, according to a non-limiting embodiment.

Turning now to FIG. 3, a cross-section of mobile electronic device 100 is shown, taken as indicated by the line "X3-X3" in FIG. 1. As seen in FIG. 3, mobile electronic device 100 includes an electrical ground member 300 which supports or is otherwise coupled to antenna 150. Antenna 150 can take a wide variety of configurations, depending on intended application of antenna 150 (that is, the intended nature of link 142 and network 144 with which mobile electronic device 100 will interact).

In the present example, electrical ground member 300 is a printed circuit board (PCB), and will therefore be referred to herein as PCB 300. PCB 300 supports various internal components of mobile electronic device, including processor 132. PCB 300 can also be electrically connected to other components of mobile electronic device 100, such as display 112, as well as the other input and output devices of mobile electronic device.

Also seen in FIG. 3 is conductive ring 108, which surrounds PCB 300 and antenna 150. As will now be apparent, display 112 is also conductive and ring 108 in combination with display 112 can therefore form a conductive open box around antenna 150. Further, display 112 can be electrically connected to ring 108 in some examples. In other words, ring 108 and display 112 can present obstacles to radiation generated by antenna 150.

Mobile electronic device 100 also includes a conductive tuning member 304 disposed between ring 108 and PCB 300. In general, conductive tuning member 304 is for transforming an impedance between electrical ground member (e.g. PCB) 300 and conductive ring 108. Tuning member 304 is connected at a first end (i.e. shorted) to ring 108 by a first short 308, and to PCB 300 (specifically, to a ground plane of PCB 300) by a second short 312. Second short 312, as seen in FIG. 3, need not be located at the second end (opposite the first end) of tuning member 304. Instead, second short 312 can be located at a point along tuning member 304 between the first and second ends of tuning member 304, such that the second end of tuning member 304 is an open end. In other examples, however, second short 312 can be located at second end 804 of tuning member 304.

Figure 4:
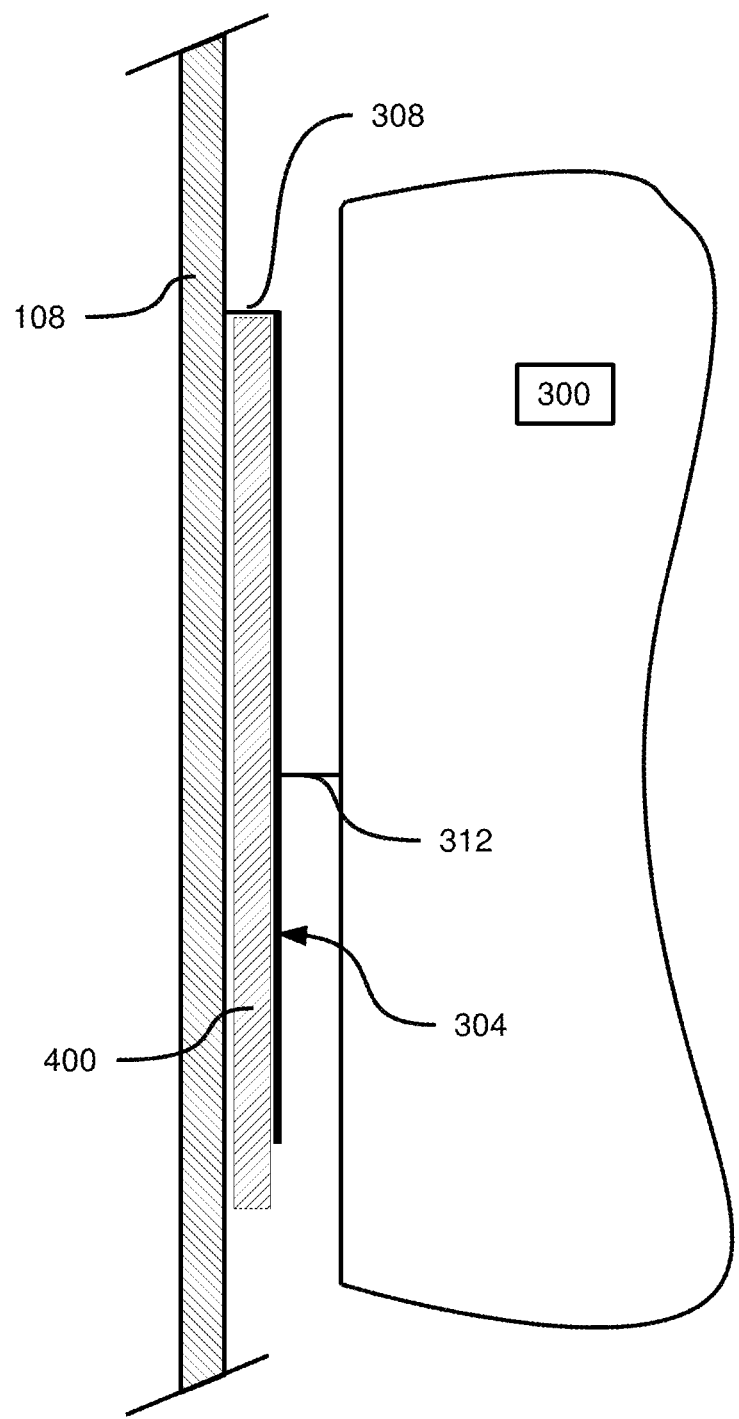
FIG. 4 depicts a partial view of the cross section of FIG. 3, according to a non-limiting embodiment.

Turning to FIG. 4, tuning member 304 is shown in greater detail in a partial view of the cross-section of FIG. 3. As discussed above, FIG. 4 shows a portion of ring 108, as well as tuning member 304 and PCB 300 and shorts 308 and 312 between ring 108 and PCB 300.

In the present example, tuning member 304 is a transmission line formed from a conductive material, such as copper; tuning member 304 will therefore also be referred to as transmission line 304 herein. In particular, transmission line 304 can be a conductive sheet, arranged substantially in parallel to ring 108, on the interior of ring 108 in a space defined between ring 108 and PCB 300. It is contemplated that transmission line 304 need not be exactly parallel to ring 108. In other words, FIG. 4 shows an edge of transmission line 304, and the faces of transmission line 304 lie orthogonally to the page on which FIG. 4 appears. It is contemplated that the size of the space between ring 108 and PCB 300 has been exaggerated for illustrative purposes in FIG. 4; the space can be smaller (or greater) than shown.

Transmission line 304 is connected to ring 108 by way of a fastener 400, such as a strip of insulating (that is, non electrically conductive) tape. Other suitable fasteners can also be employed, as will now be apparent to those skilled in the art. In general, any suitable fastener may be employed to position transmission line 304 such that transmission line 304 is electrically connected to ring 108 and PCB 300 by shorts 308 and 312 (and, as will be discussed in greater detail below, any additional connections between transmission line 304 and PCB 300) but is otherwise electrically isolated from ring 108 and PCB 300. It is contemplated that in some examples, further shorts in addition to shorts 308 and 312 may be provided.

When mobile electronic device 100 (and, more specifically, antenna 150) is in operation, transmission line 304 alters the impedance between PCB 300 and ring 108, in comparison to the impedance between PCB 300 and ring 108 in the absence of transmission line 304. Thus, the flow of current in PCB 300 and transmission line 304 is altered. As will be appreciated by those skilled in the art, bodies of material, such as the ground plane of PCB 300 and ring 108, can act as radiators themselves, particularly at low frequencies, and can therefore interfere with the radiation from antenna 150. The flow of electrical current through ring 108 and PCB 300 determines the nature and extent of any interference. It has been determined that in the absence of transmission line 304, electrical current flows through ring 108 in a direction opposite from the current flow in the nearby edges of PCB 300, which can negatively affect the performance of antenna 150. Therefore, the alteration of current flow caused by transmission line 304 can lead to reduced interference by ring 108 and improved antenna performance.

Figure 5:
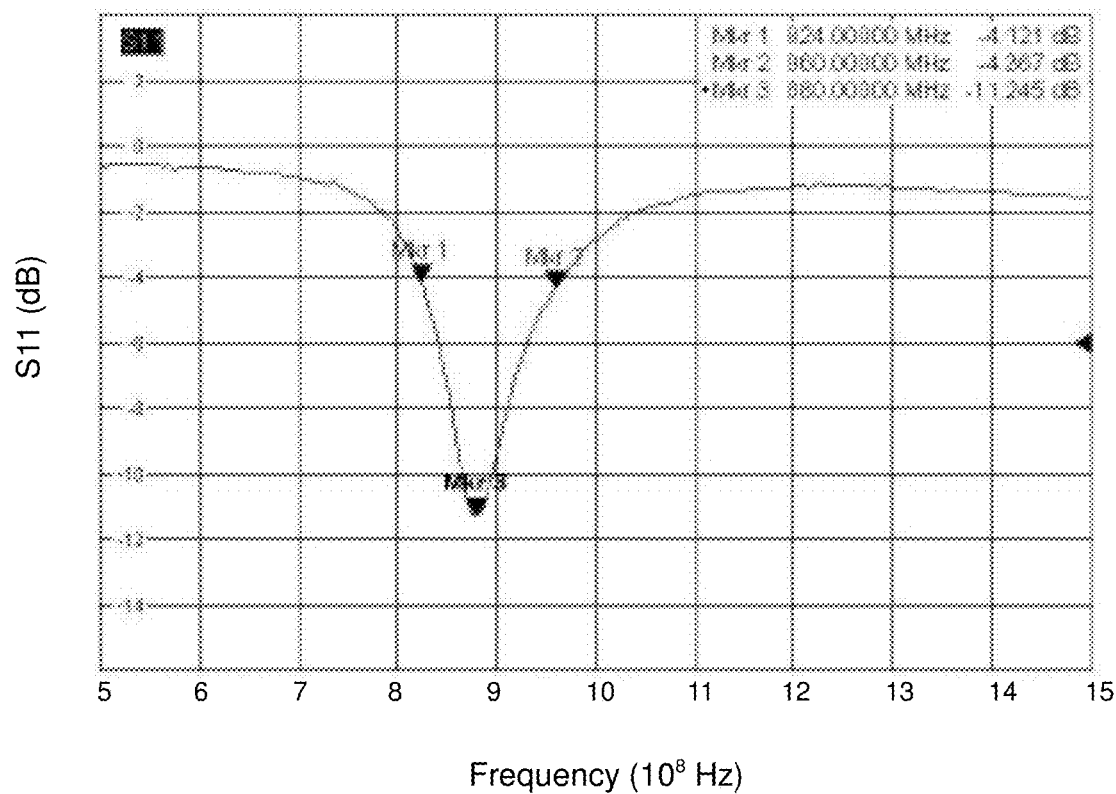
FIG. 5 depicts the open space performance of an antenna of the device of FIG. 1, according to a non-limiting embodiment.

To illustrate the effects of transmission line 304 discussed above, reference is made to FIGS. 5-7, which each plot the S11 (return loss) performance of antenna 150 versus the frequency at which antenna 150 is configured to radiate. In particular, FIG. 5 shows the free-space performance of an example antenna 150. In other words, FIG. 5 shows the performance of antenna 150 when antenna 150 is not installed within mobile electronic device 100. Antenna 150 can be, for example, an antenna as set out in PCT Application No. PCT/CA2011/050508, filed Aug. 19, 2011, the contents of which is incorporated herein by reference.

Figure 6:
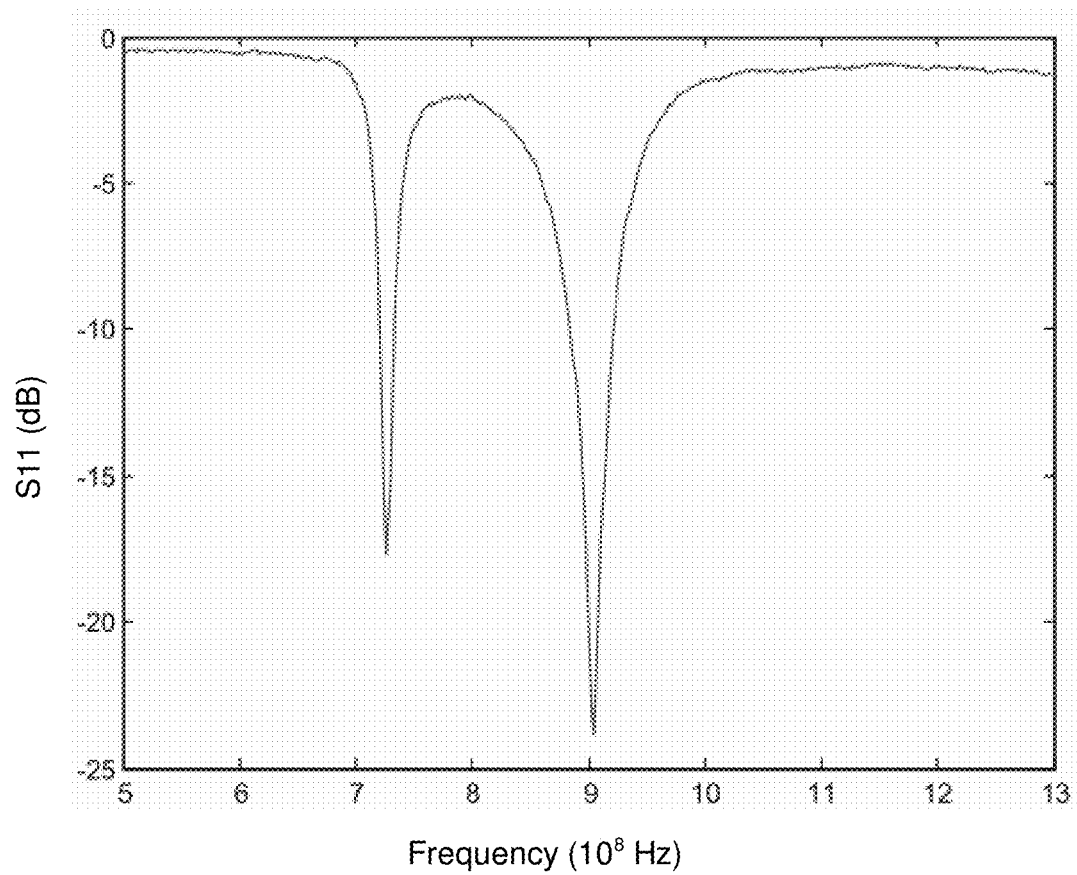
FIG. 6 depicts the performance of the antenna of the device of FIG. 1 when installed in the device of FIG. 1, according to a non-limiting embodiment.

Turning to FIG. 6, the performance of antenna 150 is shown when antenna 150 is installed within housing 104 of mobile electronic device 100 as discussed above, but in the absence of transmission line 304. As seen in FIG. 6, antenna 150 becomes narrow-banded (about −2 dB each side), in comparison with the free space performance shown in FIG. 5. However, an additional resonance also appears in FIG. 6, at about 700 MHz.

Figure 7:
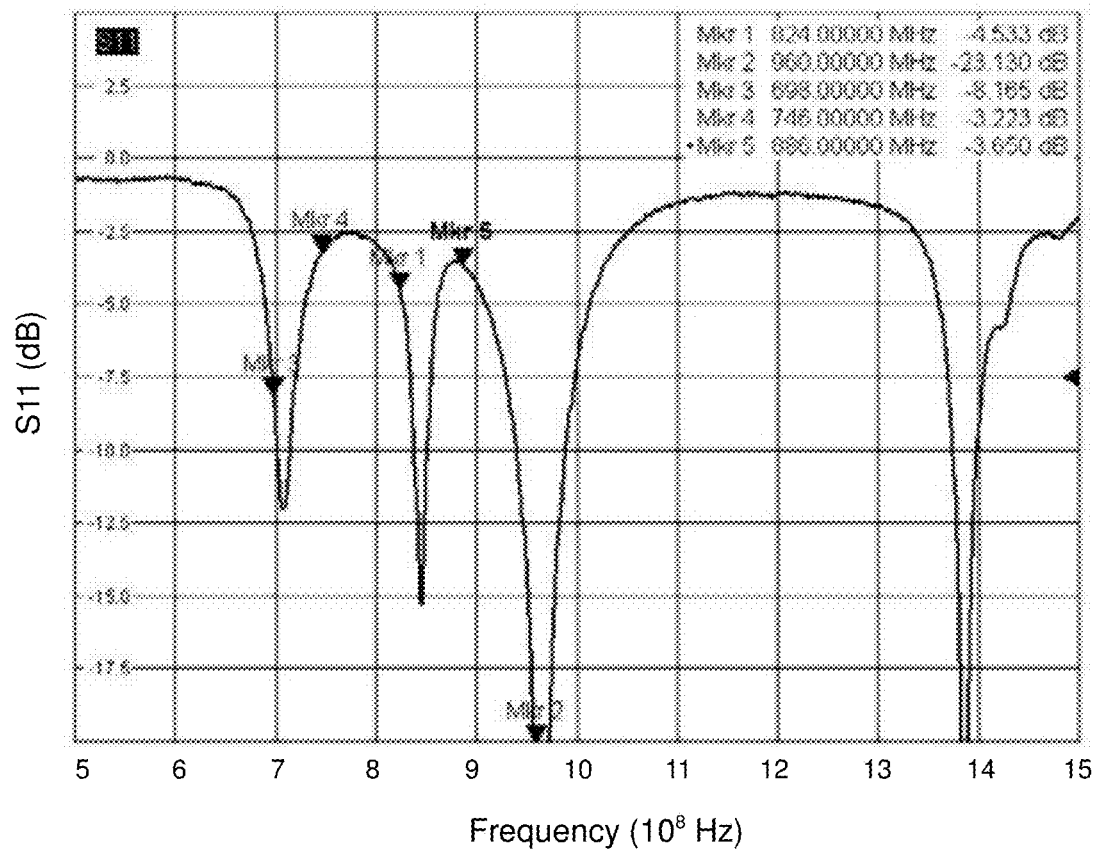
FIG. 7 depicts the performance of the antenna of the device of FIG. 1 when a conductive tuning member is provided, according to a non-limiting embodiment.

Turning now to FIG. 7, the performance of antenna 150 is shown when antenna 150 is installed within housing 104 of mobile electronic device 100, and when transmission line 304 is connected as shown in FIGS. 3 and 4. As seen in FIG. 7, the bandwidth of antenna 150 is broadened, and a 698 MHz to 746 MHz band (suitable for use in LTE networks, for example) can also be obtained. In addition, antenna 150 can cover the GSM 850/900 MHz bands.

Therefore, it will now be apparent to those skilled in the art that transmission line 304, when connected to ring 108 and PCB 300, can improve the performance of antenna 150 by altering the impedance between ring 108 and PCB 300 and thereby disrupting the current flow between PCB 300 and ring 108.

Figure 8:
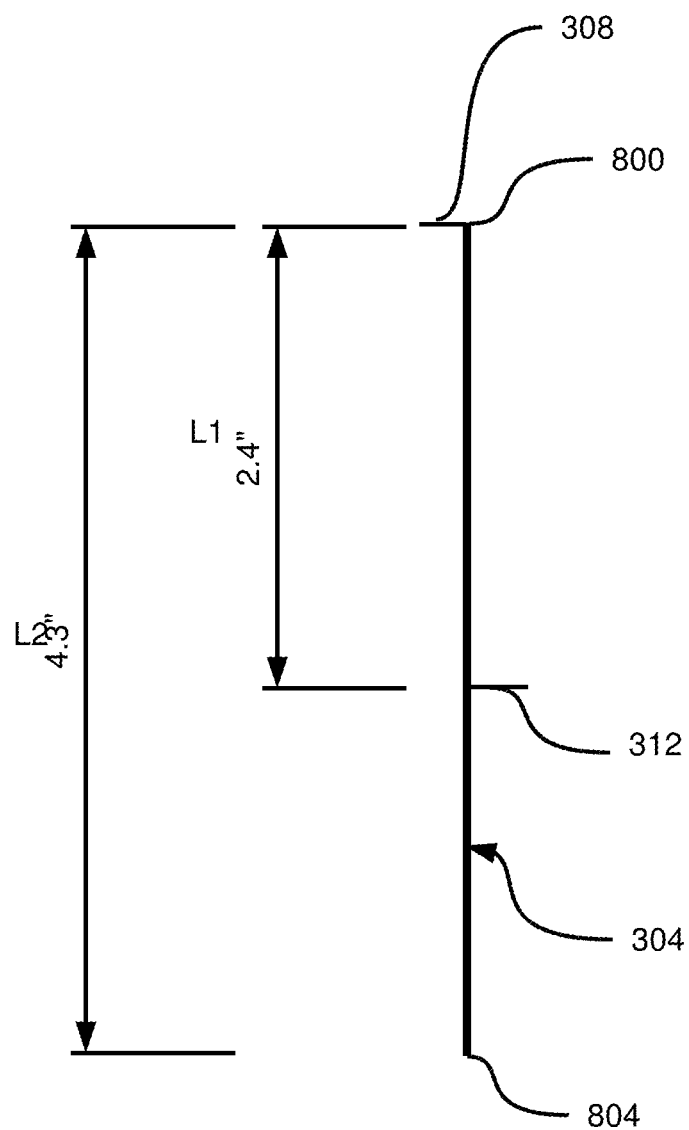
FIG. 8 depicts the conductive tuning member of FIG. 4, according to a non-limiting embodiment.

The effect of transmission line 304 on the performance of antenna 150 is determined at least in part by the configuration of transmission line and shorts 308, 312. Referring now to FIG. 8, the configuration of transmission line 304 will be discussed in greater detail.

FIG. 8 depicts transmission line 304 and shorts 308 and 312 in isolation, for illustrative purposes. As discussed above, short 308 provides the electrical connection between transmission line 304 and ring 108 (not shown in FIG. 8), while short 312 provides the electrical connection between transmission line 304 and PCB 300 (not shown in FIG. 8). Transmission line 304 has first and second ends, labelled as ends 800 and 804 respectively in FIG. 8.

The parameters determining the effect of transmission line 304 include the distance between first short 308 and second short 312, denoted "L1" in FIG. 8. The parameters determining the effect of transmission line 304 also include the total length of transmission line 304, meaning the distance between first end 800 and second end 804, denoted "L2" in FIG. 8.

In the present example, first short 308 is adjacent first end 800 of transmission line 304. In other words, first short 308 is located close to, but not necessarily exactly at, first end 800 (although first short 308 can be exactly at first end 800 in some examples).

The parameters discussed above can be selected to influence the performance of antenna 150 as desired (for example, based on the nature of network 144 with which mobile electronic device 100 will be interacting, and on the nature of link 142 over which such interactions will be carried). An example mobile electronic device 100 will now be discussed, in conjunction with various values for the above parameters and their effects on antenna performance. It is contemplated that transmission line 304 or other conductive tuning members can be used with a wide range of other configurations for mobile electronic device 100; the discussion below is non-limiting and provided for illustrative purposes.

The example mobile electronic device 100 to be discussed below is as shown in FIGS. 1 and 3. The example mobile electronic device 100 has external dimensions of 108 mm (height)×60 mm (width)×8 mm (depth). The height of antenna 150 is about 3.2 mm and the ground clearance of antenna 150 is about 10 mm; the thickness of PCB 300 is about 0.8 mm.

Figure 9A:
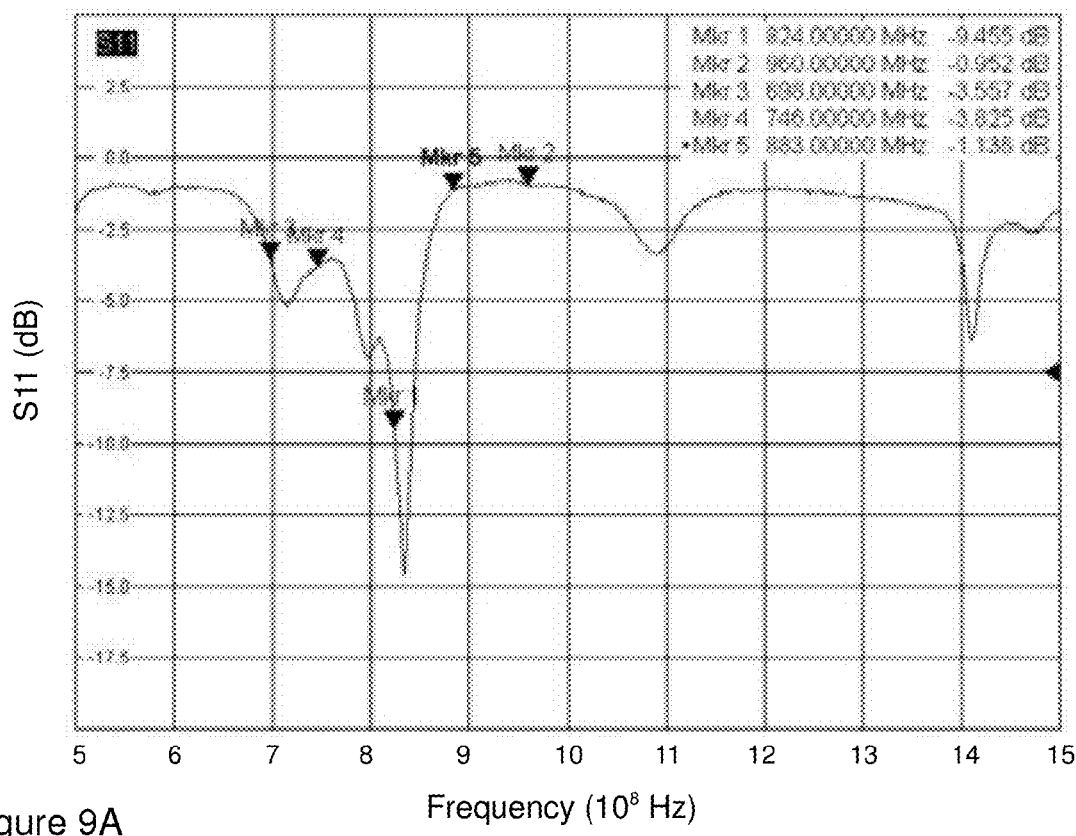
FIGS. 9A, 9B, 10A, 10B, 11A, 11B and 12 depict the performance of the antenna of the device of FIG. 1 for various configurations of the conductive tuning member of FIG. 4, according to a non-limiting embodiment.
Figure 9B:
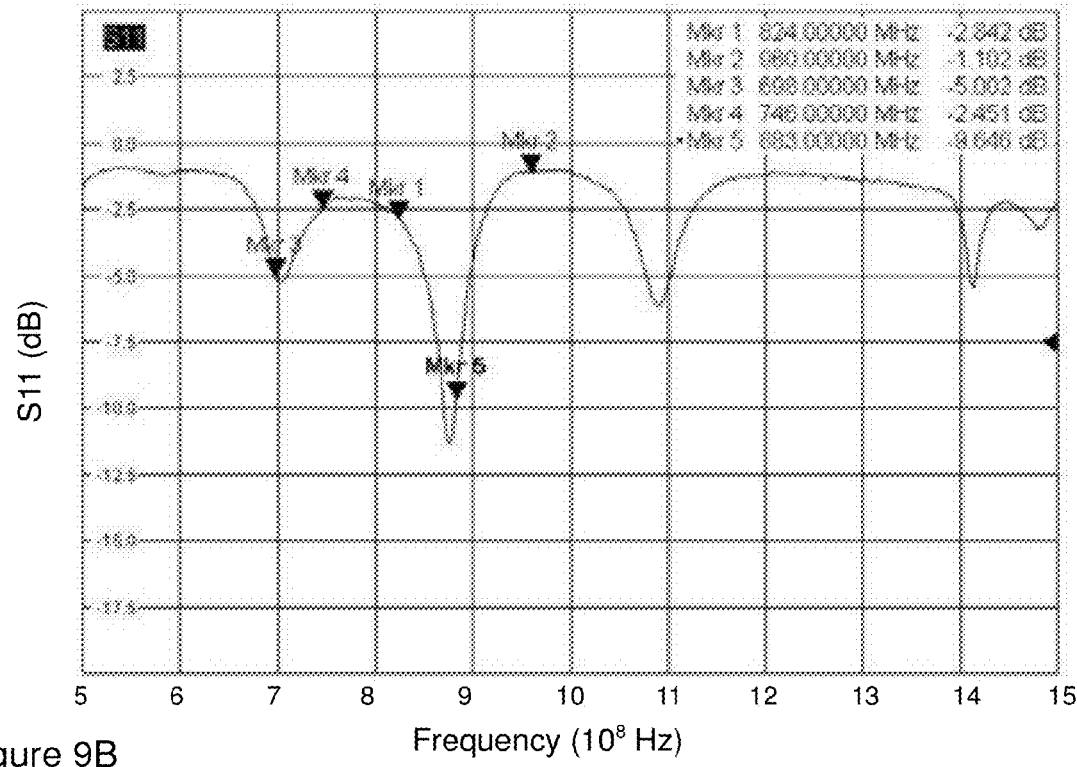
Figure 10A:
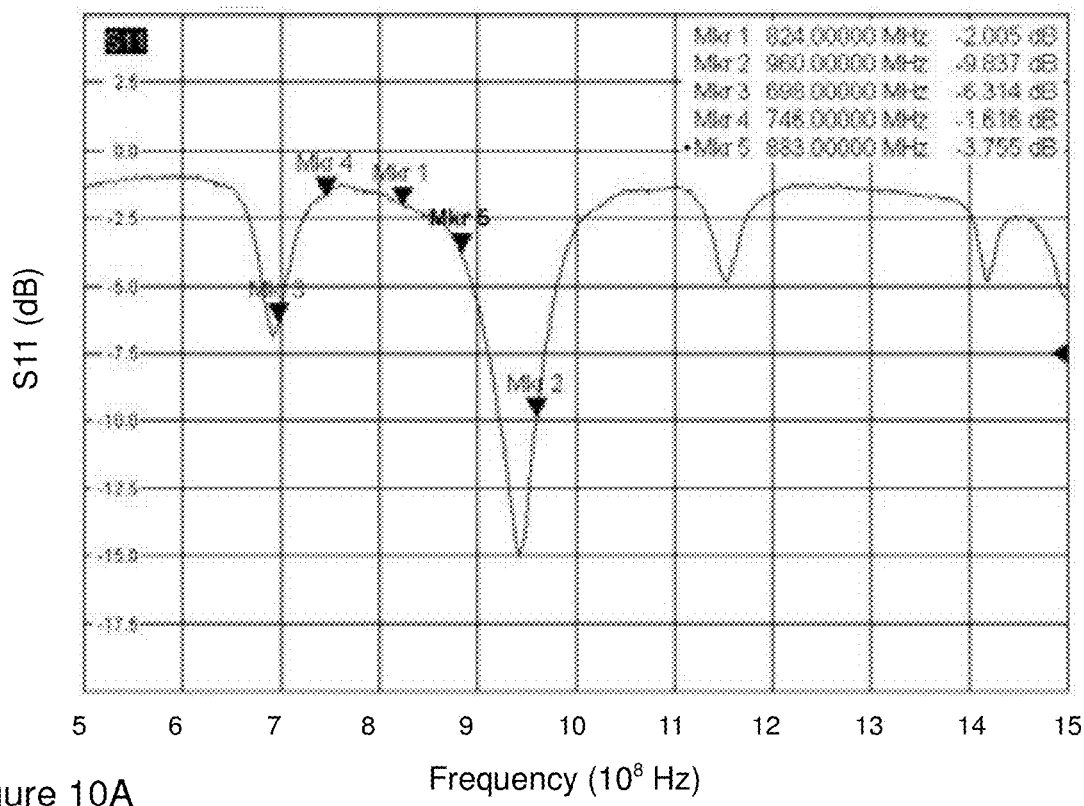
Figure 10B:
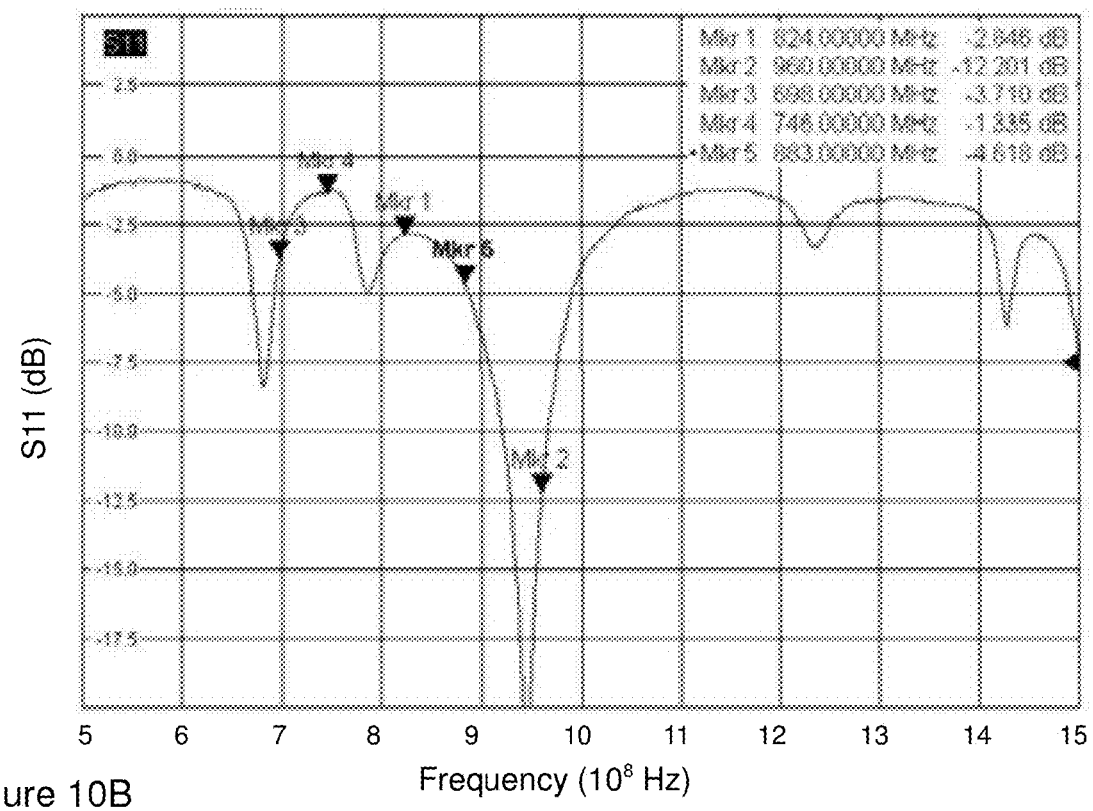
Figure 11A:
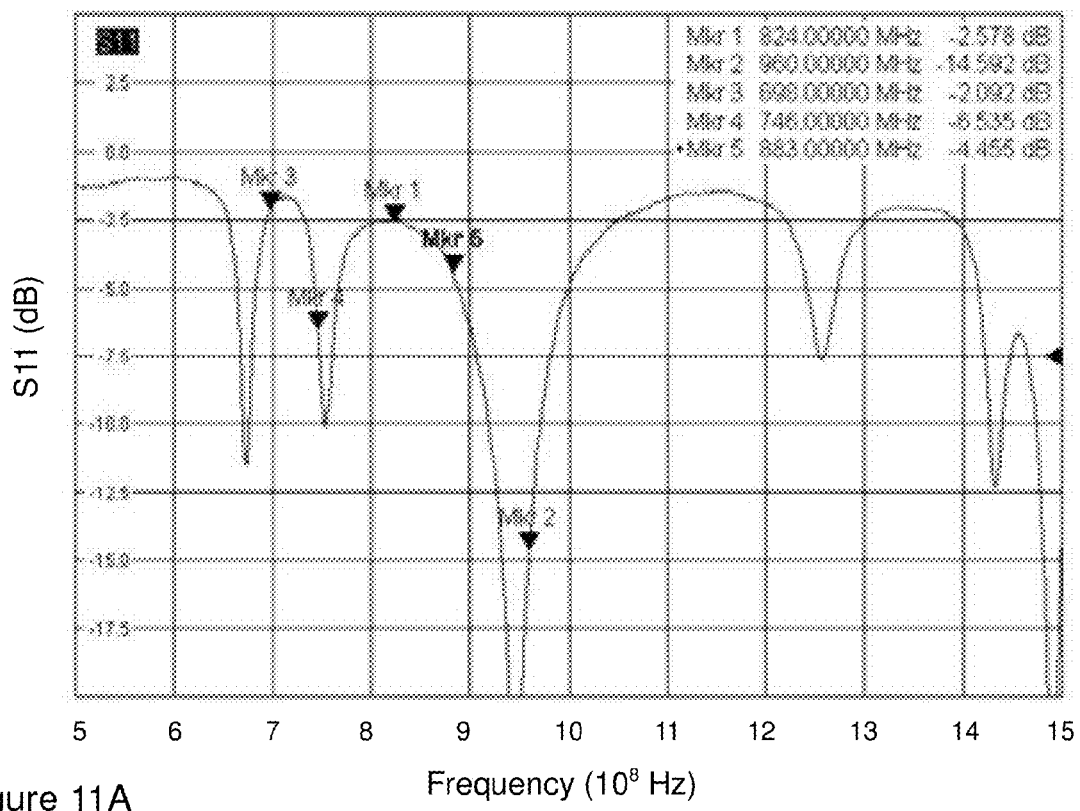
Figure 11B:
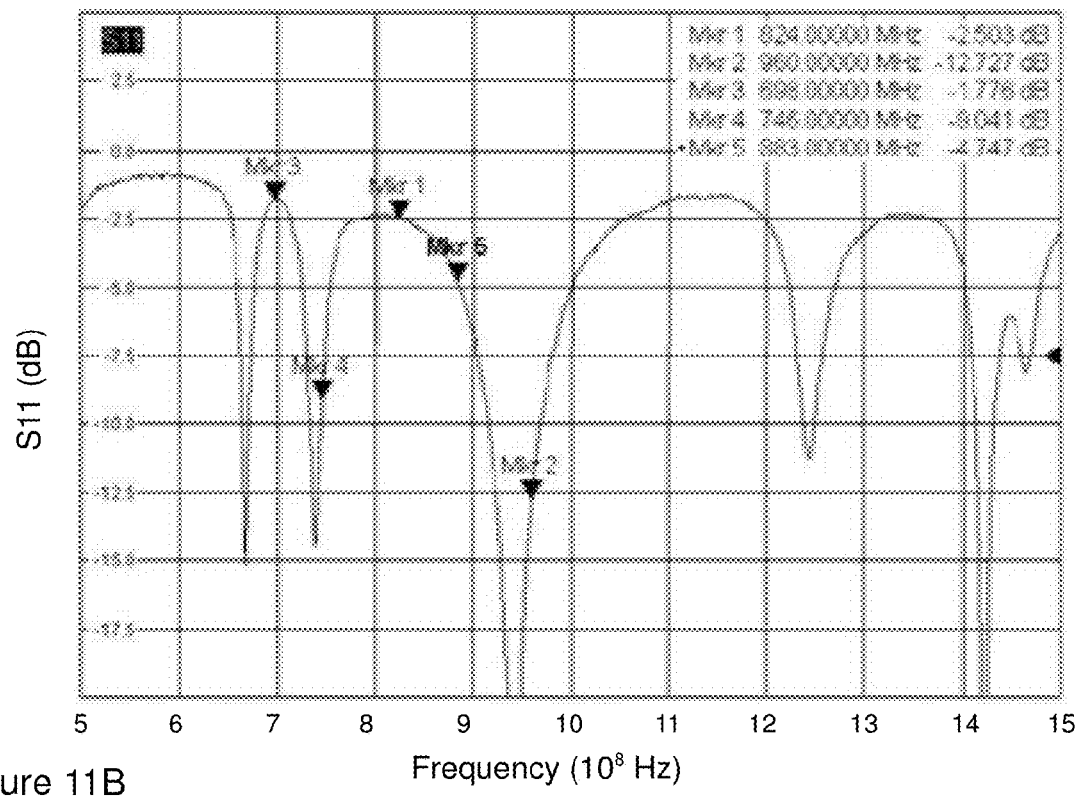

Referring now to FIGS. 9A-11B, the performance of antenna 150 is shown for various values of the parameter L1 (that is, the distance between the first short and the second short. In particular, FIG. 9A shows antenna performance with L1=5 mm; FIG. 9B shows antenna performance with L1=15 mm; FIG. 10A shows antenna performance with L1=25 mm; FIG. 10B shows antenna performance with L1=40 mm; FIG. 11A shows antenna performance with L1=55 mm; and FIG. 11B shows antenna performance with L1=70 mm.

As seen in the above-mentioned drawings, increasing L1 from 5 mm to 15 mm and then 25 mm results in the resonances at about 700 MHz and about 830 MHz, which are partially overlapping (forming a "joint resonance") in FIG. 9A, separating such that, in FIG. 10A those two resonances appear instead at about 680 MHz and about 950 MHz.

At L1=40 mm (shown in FIG. 10B), an additional minor resonance appears, at about 780 MHz. The impedance-matching of this additional resonance increases as L1 is increased to 55 mm and then to 70 mm, and also shifts lower in frequency. Thus, as shown in FIG. 11B, the additional resonance has shifted to about 740 MHz, in addition to becoming better impedance-matched (that is, forming a larger negative spike in S11 performance).

It is contemplated that the value for L1 can therefore be chosen from among those discussed above, or a variety of other values, depending on the final performance required of antenna 150. For example, an L1 value of 5 mm may provide improved performance in the LTE 698-798 MHz band. As another example, an L1 value of 40 mm may provide improved performance in the CDMA850/GSM900 MHz band. In addition, as L1 is increased beyond 40 mm, it may be possible to obtain acceptable antenna performance in all three of the above-mentioned bands.

Figure 12:
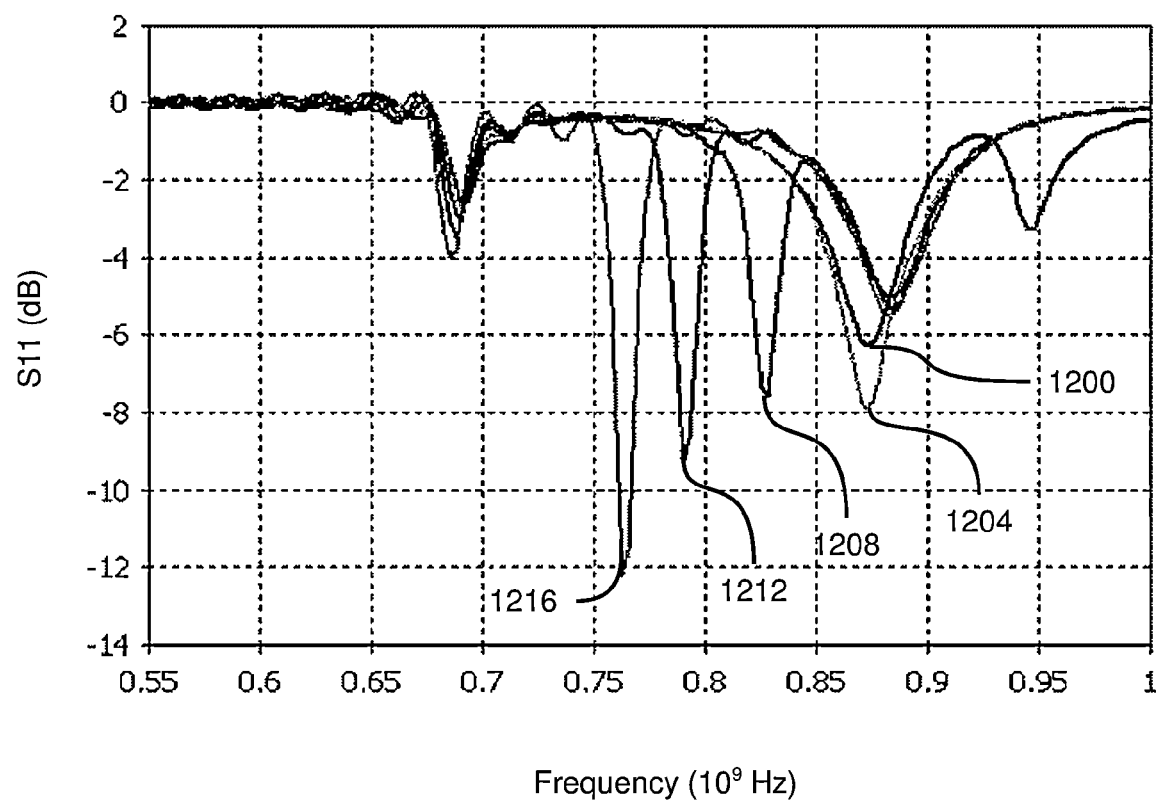

Turning now to FIG. 12, the performance of antenna 150 is shown for various values of the parameter L2 (that is, the total length of transmission line 304). In the experimental set-up used to obtain the measurements shown in FIG. 12, first short 308 is adjacent first end 800 and second short 312 is adjacent second end 804. Thus, in this particular example, L1 and L2 are equal to each other.

As seen in FIG. 12, an L2 value of 10 mm is illustrated by curve 1200; an L2 value of 20 mm is illustrated by curve 1204; an L2 value of 30 mm is illustrated by curve 1208; an L2 value of 40 mm is illustrated by curve 1212; and an L2 value of 50 mm is illustrated by curve 1216. At L2=10 mm, resonances at about 870 MHz and 680 Mhz are present. As L2 increases towards 50 mm, an additional resonance appears, and shifts in frequency, beginning at about 830 MHz for curve 1208 (L2=30 mm) and decreasing to about 760 MHz for curve 1216 (L2=50 mm).

From the above, a method of tuning mobile electronic device 100 will now be apparent to those skilled in the art. The method can include fastening conductive tuning member 304 (such as a transmission line) between conductive ring 108 and electrical ground member 300 (such as a PCB). Following the attachment of conductive tuning member 304, the method can include selecting first and second short locations for connecting conductive tuning member 304 to conductive ring 108 and electrical ground member 300, respectively. The method can further include measuring the performance of antenna 150, and adjusting the selected parameters based on the results of the measuring.

Variations to the above are contemplated. For example, although conductive tuning member 304 is shown inside ring 108, it is possible to mount conductive tuning member externally to ring 108 in some examples.

In other variations, conductive tuning member 304 need not be a conductive sheet as described. Indeed, a variety of tuning member structures are contemplated, including a coax line, buried microstrip lines, and the like. Additional tuning member geometries will now occur to those skilled in the art.

In an additional variation, in some examples conductive tuning member 304 can be connected to electrical ground member 300 at a plurality of locations, instead of the single second short 312 discussed above. The plurality of locations can be connected to electrical ground member 300 via ON/OFF pins, which can be set to either closed (e.g. shorted) or open positions to select the parameter L1. The setting of such pins or other suitable switching components, in some examples, can be conducted automatically by processor 132 based on the currently active operation frequency of antenna 150.

In another variation, rather than providing ON/OFF pins on electrical ground member 300, electrical grounding member 300 can carry discrete components or other circuitry, such as LC circuits (that is, "resonant circuits") at each of the locations at which conductive tuning member 304 is connected to electrical ground member 300. As will now be apparent to those skilled in the art, LC circuits can be selected for frequency response, such that at some frequencies, the LC circuit behaves as an open circuit while at other frequencies the LC circuit behaves as a short. Thus, which of the plurality of short locations are "active" (that is, which locations are actually shorting conductive tuning member 304 to electrical ground member 300) at any given time depends on the operating frequency of antenna 150.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A mobile electronic device, comprising:
 a housing having a front, a back, and a perimeter sidewall extending between the back and the front;
 an electrical ground member housed within the housing and spaced from the perimeter sidewall;
 an antenna mounted on the electrical ground member;
 a conductive ring extending around the perimeter sidewall of the housing; and
 an insulating fastener connected to a surface of the conductive ring and extending substantially parallel to a portion of the conductive ring;
 a transmission line disposed on the insulating fastener and extending substantially parallel to the portion of the conductive ring to electrically isolate the transmission line from the conductive ring;
 a first short electrically connected to the conductive ring and to the transmission line at a first point along a length of the transmission line; and
 a second short electrically connected to the electrical ground member and to the transmission line at a second point along the length of the transmission line;
 wherein the transmission line tunes the antenna by transforming an impedance between the electrical ground member and the antenna when the antenna is in operation.

2. The mobile electronic device of claim 1, wherein the conductive ring extends continuously around the perimeter sidewall of the housing to surround the electrical ground member and the antenna.

3. The mobile electronic device of claim 1, wherein the transmission line comprises one of a conductive sheet, a coax line and a buried microstrip.

4. The mobile electronic device of claim 3, wherein the transmission line comprises a conductive sheet, and wherein the conductive sheet is supported on the conductive ring by the insulating fastener.

5. The mobile electronic device of claim 1, wherein the electrical ground member is a printed circuit board (PCB).

6. The mobile electronic device of claim 5, wherein the antenna is mounted on the PCB.

7. The mobile electronic device of claim 1, further comprising a display exposed by the housing and coupled to the electrical ground member to form an conductive open box around the antenna.

8. The mobile electronic device of claim 7, wherein the display is electrically connected to the conductive ring to provide an obstacle to radiation generated by the antenna.

9. The mobile electronic device of claim 1, wherein the transmission line comprises opposing first and second ends, and wherein the first short is adjacent the first end.

10. The mobile electronic device of claim 9, wherein the second short is located between the first and second ends, such that the second end is open.

11. The mobile electronic device of claim 1, further comprising at least one additional short electrically connected to the transmission line and to the electrical ground member.

12. The mobile electronic device of claim 11, wherein each of the second short and the at least one additional short are connected to a different one of a plurality of discrete components on the electrical ground member.

13. The mobile electronic device of claim 12, wherein each of the plurality of discrete components comprises a resonant circuit.

14. A method, comprising:
fastening an insulating fastener to a portion of a surface of a conductive ring extending around a perimeter sidewall of a housing of a mobile electronic device such that the insulating fastener extends substantially parallel to the portion of the conductive ring;
fastening a transmission line to the insulating fastener such that the transmission line extends substantially parallel to the portion of the conductive ring and the transmission line is electrically isolated from the conductive ring;
selecting a first short location along a length of the transmission line and connecting a first short from the first short location to the conductive ring;
selecting a second short location along the length of the transmission line and connecting a second short from the second short location to the electrical ground member; and
wherein the transmission line is configured, following connection of the first short and the second short, to tune an antenna supported by the electrical ground member by transforming an impedance between the electrical ground member and the antenna when the antenna is operational.

15. The mobile electronic device of claim 1, wherein:
the transmission line is disposed on the insulating fastener within the housing.

16. The mobile electronic device of claim 1, wherein:
the is disposed on the insulating fastener outside the housing.

17. The mobile electronic device of claim 1, wherein the insulating fastener is a strip of insulating tape.

18. The method of claim 14, further comprising:
measuring performance of an antenna of the mobile electronic device; and
adjusting at least one of a length of the transmission line and a distance between the first and second short locations based on the measured performance of the antenna.

* * * * *